(12) United States Patent
Patel

(10) Patent No.: US 8,647,425 B2
(45) Date of Patent: Feb. 11, 2014

(54) AZAPHTHALOCYANINES AND THEIR USE IN PRINTING

(75) Inventor: Prakash Patel, Blackley (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 130 days.

(21) Appl. No.: 13/499,426

(22) PCT Filed: Oct. 6, 2010

(86) PCT No.: PCT/GB2010/051668
§ 371 (c)(1),
(2), (4) Date: Mar. 30, 2012

(87) PCT Pub. No.: WO2011/042735
PCT Pub. Date: Apr. 14, 2011

(65) Prior Publication Data
US 2012/0188317 A1 Jul. 26, 2012

(30) Foreign Application Priority Data

Oct. 7, 2009 (GB) .................................. 0917533.2

(51) Int. Cl.
*C09D 11/02* (2006.01)
*C09B 47/04* (2006.01)
*C09B 47/06* (2006.01)

(52) U.S. Cl.
USPC ..................... 106/31.47; 106/31.49; 540/126; 540/131; 540/133; 8/661

(58) Field of Classification Search
USPC ............ 106/31.47, 31.49; 540/126, 131, 133; 8/661; 347/86; 428/195.1
See application file for complete search history.

(56) References Cited

U.S. PATENT DOCUMENTS

| 3,458,517 | A | 7/1969 | Stepp et al. | |
|---|---|---|---|---|
| 7,097,701 | B2 * | 8/2006 | Tateishi et al. | 106/31.49 |
| 7,208,034 | B2 | 4/2007 | Ozawa | |
| 7,211,134 | B2 | 5/2007 | Tateishi et al. | |
| 7,219,988 | B2 | 5/2007 | Hanaki et al. | |
| 7,281,788 | B2 | 10/2007 | Yabuki et al. | |
| 7,293,867 | B2 | 11/2007 | Ogawa et al. | |
| 7,311,393 | B2 | 12/2007 | Taguchi et al. | |
| 7,393,094 | B2 | 7/2008 | Taguchi et al. | |
| 8,529,685 | B2 * | 9/2013 | Patel | 106/31.47 |
| 2006/0017792 | A1 * | 1/2006 | Tateishi et al. | 347/100 |
| 2006/0246364 | A1 | 11/2006 | Fujimori | |
| 2009/0029120 | A1 * | 1/2009 | Fujii et al. | 106/31.47 |
| 2009/0247742 | A1 * | 10/2009 | Tateishi et al. | 540/125 |
| 2011/0143106 | A1 | 6/2011 | Patel | |
| 2011/0234687 | A1 * | 9/2011 | Patel et al. | 106/31.49 |
| 2012/0081482 | A1 * | 4/2012 | Dunwoody et al. | 347/86 |

FOREIGN PATENT DOCUMENTS

| EP | 1 428 859 | 6/2004 |
|---|---|---|
| EP | 1 985 668 | 10/2008 |
| WO | 2005/066289 | 7/2005 |
| WO | 2010/020802 A2 | 2/2010 |
| WO | 2010/070313 A3 | 6/2010 |

OTHER PUBLICATIONS

International Search Report of PCT/GB2010/051668, dated Mar. 4, 2011.

* cited by examiner

*Primary Examiner* — Helene Klemanski
(74) *Attorney, Agent, or Firm* — Morgan, Lewis & Bockius LLP

(57) ABSTRACT

A process for preparing azaphthalocyanine or metallo-azaphthalocyanine dyes Also novel compounds, inks, printing processes, printed materials (including color filters) and ink-jet cartridges.

14 Claims, No Drawings

AZAPHTHALOCYANINES AND THEIR USE IN PRINTING

This is a Section 371 national phase filing based on PCT/GB2010/051668, filed Oct. 6, 2010, which claims priority from GB Application No. 0917533.2, filed Oct. 7, 2009.

This invention relates to dyes and mixtures of dyes, compositions and inks, to printed substrates (including patterned substrates such as color filters), to printing processes and to ink-jet printer cartridges.

Ink-jet printing is a non-impact printing technique in which droplets of ink are ejected through a fine nozzle onto a substrate without bringing the nozzle into contact with the substrate. The set of inks used in this technique typically comprise yellow, magenta, cyan and black inks.

While ink-jet printers have many advantages over other forms of printing and image development there are still technical challenges to be addressed. For example, there are the contradictory requirements of providing ink colorants that are soluble in the ink medium and yet display excellent wetfastness (i.e. prints do not run or smudge when printed). The inks also need to dry quickly to avoid sheets sticking together after they have been printed, but they should not form a crust over the tiny nozzle used in the printer. Storage stability is also important to avoid particle formation that could block the tiny nozzles used in the printer especially since consumers can keep an ink-jet ink cartridge for several months. Furthermore, and especially important with photographic quality reproductions, the resultant images should not bronze or fade rapidly on exposure to light or common oxidising gases such as ozone. It is also important that the shade and chroma of the colorant are exactly right so that any image may be optimally reproduced.

Color filters, also known as optical filters, are a component of colored liquid crystal displays (LCDs) used as flat screen displays in, for example, small television receivers or portable computers. Typically, a white back-light is shone through a liquid crystal layer and then a color filter to produce an image of the desired color by the transmitted light. The LCD layer comprises an addressable array of pixels. The light at any pixel can be switched on and off by applying a voltage to the liquid crystal film which changes the orientation of the polarising liquid crystals to block the back-light. The pixels are in register with a trichromatic array of color filter elements to produce a full color screen capable of displaying images. Some LCD displays are constructed to be viewed by reflected light, but still require a color filter to produce a full color image. Color filters are equally useful for other display technologies such as plasma display panels, cathode ray tubes and electroluminescent displays and as a component of solid state imaging devices. New colorants with properties which are useful in color filters are desirable.

The present invention provides a process for preparing azaphthalocyanine dyes and salts thereof or metallo-azaphthalocyanine dyes and salts thereof which comprises cyclising a compound of Formula (1) with a compound of Formula (2) and/or Formula (3) and a compound of Formula (4) and/or Formula (5):

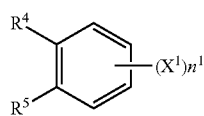

Formula (1)

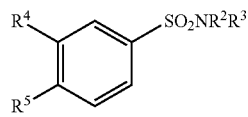

Formula (2)

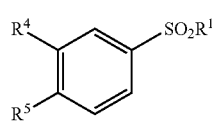

Formula (3)

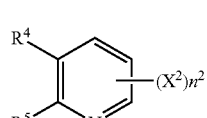

Formula (4)

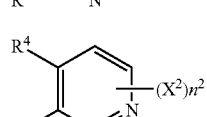

Formula (5)

wherein:
$R^1$ is a hydrocarbyl group;
$R^2$ is H or a hydrocarbyl group;
$R^3$ is H, optionally substituted alkyl, optionally substituted aryl or optionally substituted heterocyclyl;
$R^4$ and $R^5$ are cyano, carboxy, carboxamide or together form a group of formula

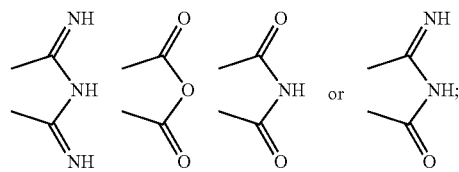

$X^1$ is an electron withdrawing group;
$X^2$ is selected from the group consisting of CN, optionally substituted $C_{1-4}$alkyl and $C_{1-4}$alkoxy;
$n^1$ is 1 to 4; and
$n^2$ is 0 to 3;
wherein the cyclisation process is carried out in the presence of a suitable nitrogen source (if required) and a metal salt (if required).

Preferably the azaphthalocyanine dyes and salts thereof or metallo-azaphthalocyanine dyes and salts thereof are metallo-azaphthalocyanine dyes and salts thereof more preferably copper or nickel azaphthalocyanine dyes and salts thereof and particularly copper azaphthalocyanine dyes and salts thereof.

Preferably $R^1$ is optionally substituted alkyl, optionally substituted aryl (especially optionally substituted phenyl or optionally substituted naphthyl) or optionally substituted heterocyclyl (especially a nitrogen containing optionally substituted heterocyclyl).

More preferably $R^1$ is optionally substituted alkyl, especially optionally substituted $C_{1-8}$ alkyl, optionally interrupted by one or more hetero atoms.

It is particularly preferred that $R^1$ is a group of Formula (6)

-L-SO$_2$NR$^6$R$^7$      Formula (6)

wherein:
$R^6$ is H or optionally substituted $C_{1-4}$alkyl;
$R^7$ is H or optionally substituted $C_{1-4}$alkyl; and
L is optionally substituted $C_{1-4}$alkylene.

Preferably $R^6$ is H or methyl. More preferably $R^6$ is H.

Preferably $R^7$ is $C_{1-4}$alkyl carrying at least one substituent selected from the group consisting of —OH, —SO$_3$H, —CO$_2$H and —PO$_3$H$_2$.

L is preferably unsubstituted alkylene, more preferably L is a group of formula —CH$_2$CH$_2$—.

Preferably $R^2$ is H or optionally substituted $C_{1-8}$alkyl (optionally interrupted by one or more hetero atoms) especially $C_{1-8}$alkyl (optionally interrupted by one or more hetero atoms) substituted with 1 or more substituents selected from; water solubilising groups, optionally substituted heteroaryl or optionally substituted phenyl.

It is particularly preferred that $R^2$ is H; optionally substituted $C_{1-4}$alkyl (optionally interrupted by one or more hetero atoms) carrying 1 or 2, particularly 2, water solubilising groups selected from the group consisting of —SO$_3$H, —CO$_2$H and —PO$_3$H$_2$; optionally substituted $C_{1-4}$alkyl (optionally interrupted by one or more hetero atoms) carrying an optionally substituted heteroaryl group (where preferably the heteroaryl group or substituent thereon carries at least one water solubilising group selected from the group consisting of —SO$_3$H, —CO$_2$H and —PO$_3$H$_2$); or optionally substituted $C_{1-4}$alkyl (optionally interrupted by one or more hetero atoms) carrying an optionally substituted aryl group (where preferably the aryl group or substituent thereon carries at least one water solubilising group selected from the group consisting of —SO$_3$H, —CO$_2$H and —PO$_3$H$_2$).

It is especially preferred that $R^2$ is optionally substituted $C_{1-4}$alkyl (optionally interrupted by one or more hetero atoms) carrying an optionally substituted triazinyl group (where preferably the triazinyl group or substituent thereon carries at least one water solubilising group selected from the group consisting of —SO$_3$H, —CO$_2$H and —PO$_3$H$_2$).

Preferably the optionally substituted triazinyl substituent on $R^2$, when it is optionally substituted $C_{1-4}$alkyl (optionally interrupted by one or more hetero atoms), comprises a group of Formula (7)

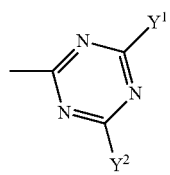

Formula (7)

wherein:
$Y^1$ is selected from the group consisting of —OR$^8$, —SR$^9$, —NR$^8$R$^9$;
$Y^2$ is selected from the group consisting of —OR$^{10}$, —SR$^{11}$, —NR$^{10}$R$^{11}$;
$R^8$, $R^9$, $R^{10}$ and $R^{11}$ are independently H, optionally substituted alkyl (optionally interrupted by one or more hetero atoms), optionally substituted aryl or optionally substituted heterocyclyl provided that at least one of the groups represented by $R^8$, $R^9$, $R^{10}$ and $R^{11}$ carries at least one substituent selected from the group consisting of —SO$_3$H, —CO$_2$H and —PO$_3$H$_2$.

Preferred groups represented by $Y^1$ and $Y^2$ may be independently selected from the group consisting of —OH, —NHCH$_3$, —N(CH$_3$)$_2$, —NHC$_2$H$_4$SO$_3$H$_2$, —N(CH$_3$)C$_2$H$_4$SO$_3$H$_2$, —NC$_3$H$_6$SO$_3$H, —NHdisulfophenyl, —NHsulfophenyl, —NHcarboxyphenyl or —NHdicarboxyphenyl, —NHsulfonaphthyl, —NHdisulfonaphthyl, —NHtrisulfonaphthyl, —NHcarboxyonaphthyl, NHdicarboxyonaphthyl, NHtricarboxyonaphthyl-NHsulfoheterocyclyl, —NHdisulfoheterocyclyl or —NHtrisulfoheterocyclyl.

More preferably the optionally substituted triazinyl substituent on $R^2$, when it is optionally substituted $C_{1-4}$alkyl (optionally interrupted by one or more hetero atoms), comprises a group of Formula (8)

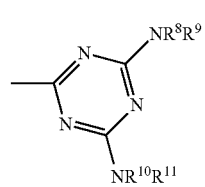

Formula (8)

wherein:
$R^8$ is H or optionally substituted $C_{1-4}$alkyl;
$R^9$ is H or optionally substituted $C_{1-4}$alkyl;
$R^{10}$ is H or optionally substituted $C_{1-4}$alkyl;
$R^{11}$ is optionally substituted alkyl, optionally substituted aryl or optionally substituted heterocyclyl carrying at least one substituent selected from the group consisting of —SO$_3$H, —CO$_2$H and —PO$_3$H$_2$.

Preferably $R^8$ is H or unsubstituted $C_{1-4}$alkyl, more preferably $R^8$ is H or methyl, especially H.

Preferably $R^9$ is H or unsubstituted $C_{1-4}$alkyl, more preferably $R^9$ is H or methyl, especially H.

Preferably $R^{10}$ is H or unsubstituted $C_{1-4}$alkyl, more preferably $R^{10}$ is H or methyl, especially H.

In a preferred embodiment $R^8$, $R^9$ and $R^{10}$ are all independently either H or methyl, more preferably $R^8$, $R^9$ and $R^{10}$ are all H.

Preferably $R^{11}$ is optionally substituted aryl carrying at least one substituent selected from the group consisting of —SO$_3$H, —CO$_2$H and —PO$_3$H$_2$. More preferably $R^{11}$ is an aryl group (particularly a phenyl group) carrying 1 to 3, especially 2, —SO$_3$H or —CO$_2$H groups.

Preferably $R^3$ is H or optionally substituted $C_{1-4}$alkyl. More preferably $R^3$ is H or methyl, especially H.

Preferably $R^4$ and $R^5$ are cyano or carboxy, especially cyano. More preferably $R^4$ and $R^5$ are the same.

$X^1$ is preferably NO$_2$, F or Cl.

It is preferred that $n^1$ is 2 to 4, more preferably $n^1$ is 4.

It is preferred that $n^2$ is 0.

It will be understood that the present invention also comprises those processes wherein independently and in any one of the compounds of Formulae (1) to (5) there is more than one type of compound of that Formula present. Thus, for example the present invention would encompass a process wherein a compound of Formula (1) was reacted with two different compounds of Formula (2) or (3) and a compound of Formula (4).

Though the process of the present invention encompasses processes where compounds of both Formula (4) and Formula (5) are reacted it is preferred that either compounds of Formula (4) or compounds of Formula (5) are utilised.

Preferred optional substituents which may be present on any one of L, $R^1$, $R^2$, $R^3$, $R^6$, $R^7$, $R^8$, $R^9$, $R^{10}$ and $R^{11}$ are independently selected from: optionally substituted alkoxy (preferably $C_{1-4}$-alkoxy), optionally substituted aryl (preferably phenyl), optionally substituted aryloxy (preferably phenoxy), optionally substituted heterocyclyl, polyalkylene oxide (preferably polyethylene oxide or polypropylene oxide), phosphato, nitro, cyano, halo, ureido, hydroxy, ester, —$NR^aR^b$, —$COR^a$, —$CONR^aR^b$, —$NHCOR^a$, carboxyester, sulfone, and —$SO_2NR^aR^b$, wherein $R^a$ and $R^b$ are each independently H, optionally substituted alkyl (especially $C_{1-4}$-alkyl), optionally substituted aryl or optionally substituted heteroaryl. When L, $R^1$, $R^2$, $R^3$, $R^6$, $R^7$, $R^8$, $R^9$, $R^{10}$ and $R^{11}$ comprise a cyclic group they may also carry an optionally substituted alkyl (especially $C_{1-4}$-alkyl) substituent. Optional substituents for any of the substituents described for $R^1$, $R^2$, $R^3$, $R^6$, $R^7$, $R^8$, $R^9$, $R^{10}$ and $R^{11}$ may be selected from the same list of substituents.

In the process of the present invention, depending on the reactants and reaction conditions, it may be advantageous to incorporate a base in the cyclisation reaction. Any suitable base may be used. Preferably the base is 1,8-diazabicyclo [5.4.0]undec-7-ene (DBU).

When the product of the process is a metallo-phthalocyanine then a metal salt is required. Any suitable salt may be used. For example, $CuCl_2$ when the product of the reaction is copper phthalocyanine.

When $R^4$ and $R^5$ do not contain nitrogen then a source of nitrogen is required if the phthalocyanine ring is to be formed. Suitable sources of nitrogen include ammonia and urea.

The process of the present invention is preferably carried out in any compatible solvent. Preferred solvents include ethylene glycol and diethylene glycol.

The preferred molar ratio of the compounds of Formula (1) to compounds of Formula (2) and/or Formula (3) and compounds of Formula (4) and/or Formula (5) is in the range of from 10/1/1 to 1/10/1 to 1/1/10. More preferably the ratio of the compounds of Formula (1) to compounds of Formula (2) and/or Formula (3) and compounds of Formula (4) and/or Formula (5) is in the range of from 2/1/1 to 1/2/1 to 1/1/2.

The cyclisation reaction is preferably performed at a temperature in the range of from 80 to 180° C., more preferably 100 to 150° C. an especially 110 to 130° C.

Preferably the cyclisation is performed in the range of from 1 to 12 hours, more preferably 2 to 8 hours and especially 3 to 6 hours The length of time for which the cyclisation is performed depends on the temperature used. For example higher temperatures require less time and lower temperatures require more time.

In a preferred embodiment cyclisation is performed at a temperature in the range of from 110 to 130° C. for a time in the range of from 3 to 6 hours.

Compounds of Formula (1) may be prepared by methods well known in the art. They are also commonly commercially available.

Compounds of Formula (2) and (3) may be prepared by methods well known in the art such as those described in U.S. Pat. No. 7,097,701 which is incorporated herein by reference.

Compounds of Formula (4) and Formula (5) may be prepared by methods well known in the art. Many compounds of Formula (4) and Formula (5) are also commercially available.

A skilled person will appreciate that the azaphthalocyanine dyes and salts thereof or metallo-azaphthalocyanine dyes and salts thereof which are the product of these reactions will be a highly disperse mixture containing isomers which vary depending on the nature and relative positions of the component rings, and the nature and position of any substituents on these component rings.

A second aspect of the invention provides azaphthalocyanine dyes and salts thereof or metallo-azaphthalocyanine dyes and salts thereof obtainable by means of a process according to the first aspect of the invention.

Preferences are as described and preferred in the first aspect of the invention

Preferably metallo-azaphthalocyanine dyes and salts thereof according to the second aspect of the invention comprise components of Formula (9) and/or Formula (10):

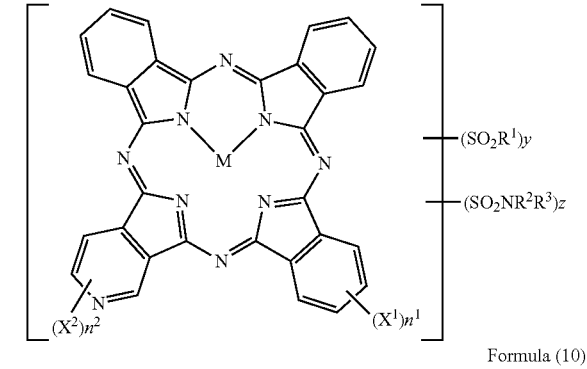

Formula (9)

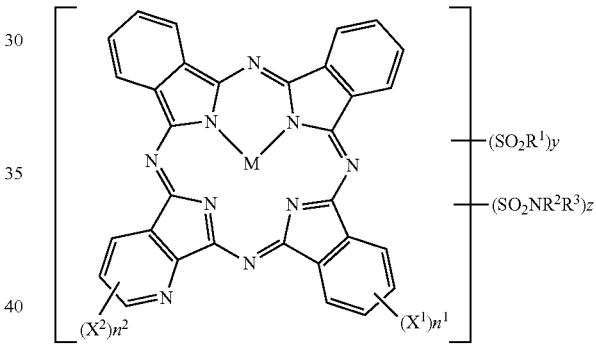

Formula (10)

wherein
M is Ni or Cu;
$R^1$; is a hydrocarbyl group;
$R^2$ is H or a hydrocarbyl group;
$R^3$ is H, optionally substituted alkyl, optionally substituted aryl or optionally substituted heterocyclyl;
$X^1$ is an electron withdrawing group;
$X^2$ is selected from the group consisting of —CN, optionally substituted $C_{1-4}$alkyl and $C_{1-4}$alkoxy;
$n^1$ is 1 to 4;
$n^2$ is 0 to 3;
y is greater than 0 and less than 4;
z is greater than 0 and less than 4; and
y+z is greater than 0 and less than 4.

These dyes are prepared as described in the first aspect of the invention they will therefore be a disperse mixture and so the values of y and z will be an average rather number than an integer.

Preferably y is in the range of from 1 to 3.

Preferably z is in the range of from 1 to 3.

Preferably y+z is in the range of from 1 to 3.

Preferences for M, $R^1$, $R^2$, $R^3$, $X^1$, $X^2$, $n^1$ and $n^2$ are as described in the first aspect of the invention The dyes of the second aspect of the invention have attractive, strong shades and are valuable colorants for use in the preparation of cyan ink-jet printing inks. They benefit from a good balance of solubility, storage stability and fastness to water, ozone and light. In particular they display excellent wet fastness, light fastness and ozone fastness.

Acid or basic groups on all of the compounds disclosed in this invention, particularly acid groups, are preferably in the form of a salt. Thus, all Formulae shown herein include the compounds in salt form.

Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. The mixtures of azaphthalocyanine or metallo-azaphthalocyanine dyes may be converted into a salt using known techniques.

Compounds disclosed in this specification may exist in tautomeric forms other than those shown. These tautomers are included within the scope of the present invention.

According to a third aspect of the present invention there is provided a mixture of dyes comprising the azaphthalocyanine dyes and salts thereof and/or metallo-azaphthalocyanine dyes and salts thereof according to the second aspect of the invention and a yellow dye or salts thereof.

Preferably the yellow dye is of Formula (11) and salts thereof:

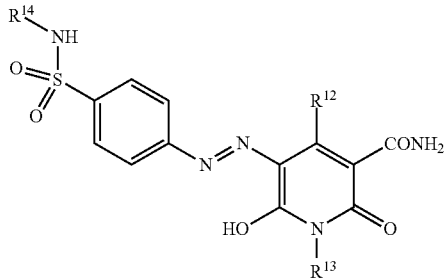

Formula (11)

wherein:

$R^{12}$ is optionally substituted $C_{1-4}$alkyl;

$R^{13}$ is optionally substituted $C_{1-12}$alkyl; and $R^{14}$ is optionally substituted $C_{1-8}$alkyl.

$R^{12}$, $R^{13}$ and $R^{14}$ may be linear branched or cyclic alkyl.

Preferably $R^{12}$ is unsubstituted $C_{1-4}$alkyl, more preferably $R^{12}$ is methyl.

Preferably $R^{13}$ is unsubstituted $C_{2-12}$alkyl, more preferably $R^{13}$ is unsubstituted $C_{6-10}$alkyl.

Preferably $R^{14}$ is unsubstituted $C_{2-8}$alkyl, more preferably $R^{14}$ is unsubstituted $C_{2-6}$alkyl.

Optional substituents present on $R^{12}$, $R^{13}$ and $R^{14}$ are as described and preferred in the first aspect of the invention.

A particularly preferred dye of Formula (11) is of Formula (12) and salts thereof:

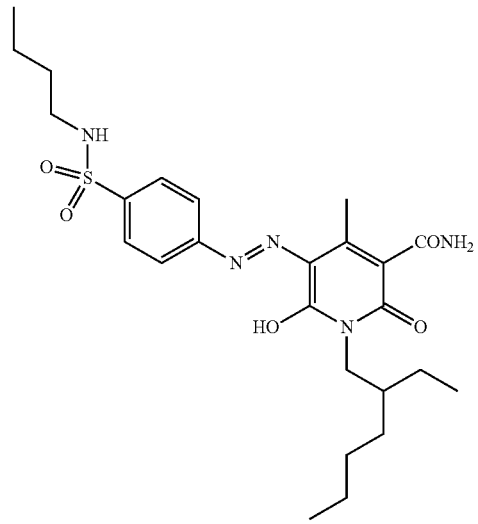

Formula (12)

Yellow azo dyes such as those dyes of Formula (11) and Formula (12) may be prepared by analogous methods to those known in the prior art.

In the third aspect of the invention the ratio of the azaphthalocyanine dyes and salts thereof and/or metallo-azaphthalocyanine dyes and salts thereof according to the second aspect of the invention and the yellow dye is preferably in the range of from 5:95 to 95:5.

In the third aspect of the invention the mixture may comprise additional components and dyes.

According to a fourth aspect of the present invention there is provided a composition comprising azaphthalocyanine dyes and salts thereof and/or metallo-azaphthalocyanine dyes and salts thereof, as described in the second aspect of the invention, or a mixture of dyes and salts thereof, as described in the third aspect of the invention, and a liquid medium.

Preferred compositions according to the fourth aspect of the invention comprise:

(a) from 0.01 to 30 parts of azaphthalocyanine dyes and salts thereof and/or metallo-azaphthalocyanine dyes and salts thereof, as described in the second aspect of the invention, or a mixture of dyes and salts thereof, as described in the third aspect of the invention; and (b) from 70 to 99.99 parts of a liquid medium;

wherein all parts are by weight.

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 80 to 99.9, more preferably from 85 to 99.5 and especially from 95 to 99 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

Preferred liquid media include water, a mixture of water and organic solvent and organic solvent free from water. Preferably the liquid medium comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethylene glycol monoallyl ether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethylene glycol, thiodiglycol, diethylene glycol and triethylene glycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

When the liquid medium comprises organic solvent free from water, (i.e. less than 1% water by weight) the solvent preferably has a boiling point of from 30 to 200° C., more preferably of from 40 to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dyes in the liquid medium. Examples of polar solvents include $C_{1-4}$-alcohols.

In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is organic solvent free from water it is a mixture of 2 to 5 different organic solvents. This allows a liquid medium to be selected that gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties.

It is preferred that the composition according to the invention is ink suitable for use in an ink-jet printer. Ink suitable for use in an ink-jet printer is ink which is able to repeatedly fire through an ink-jet printing head without causing blockage of the fine nozzles. To do this the ink must be particle free, stable (i.e. not precipitate on storage), free from corrosive elements (e.g. chloride) and have a viscosity which allows for good droplet formation at the print head.

Ink suitable for use in an ink-jet printer preferably has a viscosity of less than 20 cP, more preferably less than 10 cP, especially less than 5 cP, at 25° C.

Ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colorant or additive incorporated in the ink).

Preferably ink suitable for use in an ink-jet printer has been filtered through a filter having a mean pore size below 10 µm, more preferably below 3 µm, especially below 2 µm, more especially below 1 µm. This filtration removes particulate matter that could otherwise block the fine nozzles found in many ink-jet printers.

Preferably ink suitable for use in an ink-jet printer contains less than 500 ppm, more preferably less than 250 ppm, especially less than 100 ppm, more especially less than 10 ppm in total of halide ions.

If the composition according to the fourth aspect of the invention is to be used in forming film coatings, particularly in the manufacture a color filter, then it preferably further comprises a film-forming material. The film forming material preferably comprises one or more cross-linkable polymer precursors and optionally one or more additional cross linking agents. Examples of suitable cross-linking agents include Primid™ XL-552 and Primid™ QM-1260 (both commercially available from EMS Chemie AG), trimethylolpropane and triethanolamine. An appropriate chemical or photochemical initiator may also be included, e.g. a radical source, a photopolymerisation initiator or a dissolution inhibitor.

Inks for forming film coatings preferably comprise:
(a) 0.5 to 15 parts, more preferably 0.8 to 10 parts, especially 1 to 8 parts in total of azaphthalocyanine dyes and salts thereof and/or metallo-azaphthalocyanine dyes and salts thereof, as described in the second aspect of the invention, or a mixture of dyes and salts thereof, as described in the third aspect of the invention;
(b) from 0 to 90 parts, more preferably from 50 to 80 parts of water;
(c) from 0 to 90 parts, more preferably 0 to 60 parts of one or more organic solvent(s); and
(d) 0.1 to 50 parts, more preferably 0.2 to 30 parts of a film-forming material.

Film forming inks may also comprise radical scavengers and/or UV absorbers to help improve light and heat fastness of the ink and resultant color filter. Examples of such scavengers and absorbers include: 2-hydroxy-4-methoxy-5-sulfobenzophenone; hydroxy phenylbenzotriazole; 4-hydroxy-TEMPO; and transition metal complexes (such as nickel complexes of thiocarbamic acids). These scavengers and absorbers are used typically in an amount from 30% to 60% by weight relative to the weight of the colorant.

A fifth aspect of the invention provides a process for forming an image on a substrate comprising applying a composition, preferably ink suitable for use in an ink-jet printer, according to the fourth aspect of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Photographic quality papers are especially preferred.

A sixth aspect of the present invention provides a material preferably paper, plastic, a textile, metal or glass, more preferably paper, an overhead projector slide or a textile material, especially paper more especially plain, coated or treated papers printed with azaphthalocyanine dyes and salts thereof and/or metallo-azaphthalocyanine dyes and salts thereof as described in the second aspect of the invention or the mixture of dyes and salts thereof as described in the third aspect of the invention, a composition according to the fourth aspect of the invention or by means of a process according to the fifth aspect of the invention.

It is especially preferred that the printed material of the sixth aspect of the invention is a print on a photographic quality paper printed using a process according to the fifth aspect of the invention.

A seventh aspect of the invention provides a process for forming a film coating on a substrate which comprises applying to a substrate a composition, or ink, according to the fourth aspect of the invention which further comprises a film-forming material, as described in the fourth aspect of the invention.

In these processes the inks may be applied to the substrate by any known method, including spin-coating, bar-coating, dip-coating, curtain-coating, roller-coating and electrospray.

Preferably the printing process is ink-jet printing. The ink-jet printer preferably applies the ink to the substrate in the form of droplets which are ejected through a small nozzle onto the substrate.

In one embodiment of the seventh aspect of the present invention the film-forming materials in the composition or ink of the second aspect of the invention are thermally cross-linkable and cross-linking is affected by heating.

In an alternative embodiment the film-forming materials in the composition or ink of the fourth aspect of the invention are photo-cross-linkable and cross-linking is effected by exposing to preferably UV light. UV exposure is preferably performed through a mask such that portions which are exposed to the UV light form a film and unexposed portions do not form a film and may be readily removed from the substrate, thereby forming an array of pixels.

The process of the present invention can be used to give optionally patterned, optionally transparent films and coatings on substrates in general, including substrates which are not transparent. Preferably (e.g. if the process of the present invention is used to manufacture a color filter) the substrate is transparent. Suitable transparent substrates include glass; plastics films and plates such as those of polyvinylalcohol, polyester, polyvinylchloride, polyvinylfluoride, polycarbonate, polystyrene, polyamide or polyimide. The substrate may be flexible or rigid, e.g. a flat panel such as is used in LCD displays. A preferred substrate is glass.

The substrates may be pre-treated to improve bonding, adhesion, absorption, fusion or spreading of the composition. Suitable pre-treatments include plasma etching, e.g. where the substrate is placed in an oxygen atmosphere and subjected to an electrical discharge or application of an adhesion promoter such as a silane.

Preferably there is a patterning step in the process of the eighth aspect of the present invention. Optionally, the transparent substrate comprises discrete pixel regions.

An eighth aspect of the present invention provides a color filter comprising red, green and blue filter elements, or yellow, magenta and cyan filter elements, and comprising a film containing azaphthalocyanine dyes and salts thereof as described in the second and third aspects of the invention or a mixture of dyes and salts thereof as described in the fourth aspect of the invention. Preferably the film is obtained from a composition as described in the fourth aspect. More preferably the color filter comprises a film coating formed by a process according to the eighth aspect of the present invention.

A final aspect of the present invention provides an ink-jet printer cartridge comprising a chamber and a composition, preferably ink suitable for use in an ink-jet printer, wherein the composition is in the chamber and the composition is as defined and preferred in the fourth aspect of the present invention.

The invention is further illustrated by the following Examples in which all parts and percentages are by weight unless otherwise stated.

EXAMPLES

Preparation of Phthalonitriles and Azaphthalonitriles of Formulae (1) to (5)

Phthalonitrile A

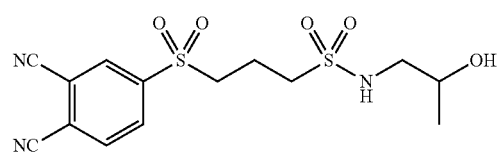 [SMILES: CC(O)CNS(=O)(=O)CCCS(=O)(=O)c1ccc(C#N)c(C#N)c1]

Phthalonitrile A corresponds to compound 8 in U.S. Pat. No. 7,211,134, which is incorporated herein by reference, and was prepared as described therein Phthalonitrile B

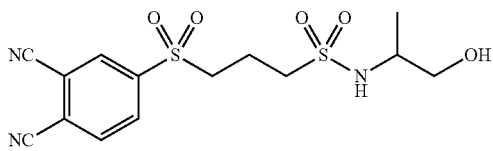 [SMILES: CC(CO)NS(=O)(=O)CCCS(=O)(=O)c1ccc(C#N)c(C#N)c1]

Phthalonitrile B was prepared as phthalonitrile A except that 2-amino-3-propanol was used in place of 1-amino-2-propanol.

Phthalonitrile C

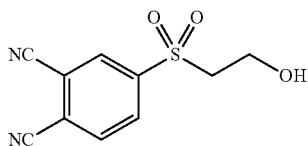 [SMILES: N#Cc1ccc(S(=O)(=O)CCO)cc1C#N]

Dimethylsulphoxide (30 ml) was added to 4-nitrophthalonitrile (10 g) followed by mercaptoethanol (4.5 g). Potassium carbonate (7.9 g) was then added portion-wise and the reaction was stirred overnight at room temperature. Water (200 ml) was added and the precipitated solid was filtered off, washed with water and dried to give the sulphide (10 g) shown below.

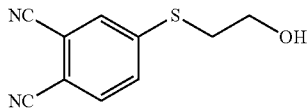 [SMILES: N#Cc1ccc(SCCO)cc1C#N]

The sulphide (5 g) was stirred in acetic acid (30 ml) and sodium tungstate dihydrate (50 mg) added followed drop-wise by 30% hydrogen peroxide (5 ml), with cooling. The reaction was stirred at room temperature for 4 hours and the acetic acid was removed by evaporation. The reaction was then triturated with ether to give a white solid which was filtered, washed with water and dried to give the product (5 g).

Phthalonitrile D

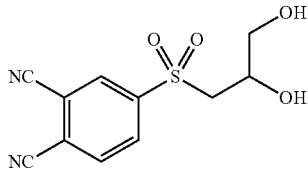 [SMILES: N#Cc1ccc(S(=O)(=O)CC(O)CO)cc1C#N]

Phthalonitrile D was prepared as phthalonitrile C except that thioglycerol was used in place of mercaptoethanol.

Phthalonitrile E

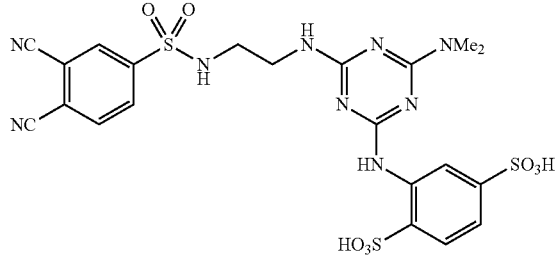 [SMILES: CN(C)c1nc(NCCNS(=O)(=O)c2ccc(C#N)c(C#N)c2)nc(Nc2cc(S(=O)(=O)O)ccc2S(=O)(=O)O)n1]

Preparation of Intermediate A

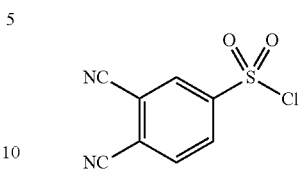

Intermediate A was prepared as described in Phosphorus, Sulfur and Silicon, 1995, 101, 161-167 which is incorporated herein by reference.

Preparation of Intermediate B

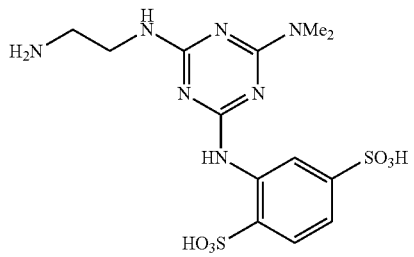 [SMILES: CN(C)c1nc(NCCN)nc(Nc2cc(S(=O)(=O)O)ccc2S(=O)(=O)O)n1]

Cyanuric chloride (9.23 g) was stirred in ice/water (2000 g) containing a few drops of calsolene oil at 0-5° C. A solution of 2,5-disulphoaniline (13.8 g) in water (50 ml) at pH 5 to 6 was then added drop wise with stirring. The reaction mixture was stirred at ≤5° C. and pH 5 to 6 for 2 hours. The pH was then raised to 7 with 2M sodium hydroxide solution and the temperature to 20-25° C. and the reaction mixture was left for 1 hour. Dimethylamine (40%, 6.3 ml) was then added and the pH was adjusted to 8.5 to 9. The reaction mixture was stirred at room temperature and pH 8.5 to 9 for 2 hours, then at pH 8.5-9, 60° C. for 1 hour and for a further 1 hour at 80° C. before being allowed to cool overnight. The next day ethylenediamine (33 ml) was added to the mixture and the reaction was stirred at 80° C. for a further 2 hours. The volume of the reaction mixture was reduced to 200 ml using a rotary evaporator, NaCl (20 g) was added and the pH was lowered to 1 with concentrated HCl. The precipitate which formed was collected by filtration, washed with 20% NaCl and slurried in methanol (170 ml) and water (9 ml) at 60° C. for 1 hour. The solid was then collected by filtration, washed with methanol (25 ml) and dried to give the product (18.5 g).

Preparation of the Title Phthalonitrile

Intermediate B (20 g) was dissolved in water (200 ml) by the addition of 2M sodium carbonate solution to pH8. Intermediate A (9.97 g) was added and the pH was adjusted to 8.5 with 2M sodium carbonate. The reaction mixture was stirred room temperature overnight and the precipitated solid filtered off, washed with propan-2-ol and dried to give the 25.51 g of phthalonitrile E Phthalonitrile F

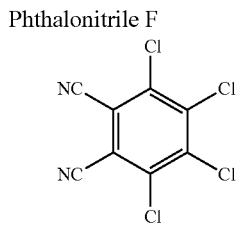

Obtained from Aldrich®.

Phthalonitrile G

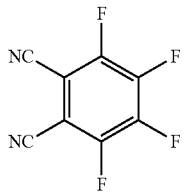 [SMILES: N#Cc1c(F)c(F)c(F)c(F)c1C#N]

Obtained from Aldrich®.

Azaphthalonitrile H

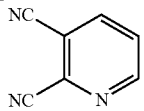

Obtained from Aldrich®.

Azaphthalonitrile I

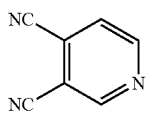

Obtained from Aldrich®.

Phthalonitrile J

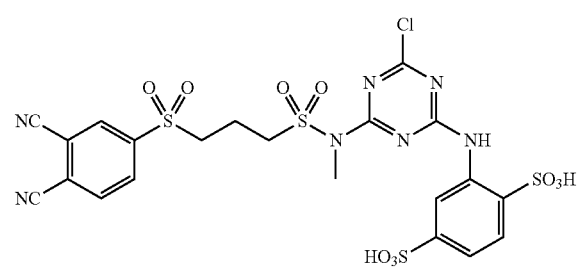 [SMILES: CN(c1nc(Cl)nc(Nc2cc(S(=O)(=O)O)ccc2S(=O)(=O)O)n1)S(=O)(=O)CCCS(=O)(=O)c1ccc(C#N)c(C#N)c1]

Preparation of Intermediate C

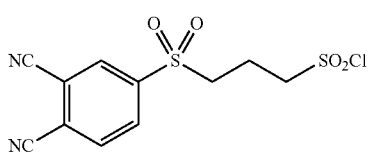 [SMILES: N#Cc1ccc(S(=O)(=O)CCCS(=O)(=O)Cl)cc1C#N]

Phthalonitrile L (47 g), prepared as described below, was added to acetonitrile (137 ml) and dimethyl acetamide (14 ml) and heated to 45° C. Phosphorous oxychloride (41 ml) was then added drop-wise and reaction was stirred at 60° C. for 2 hours. The reaction was then cooled to 30° C., drowned into water (400 ml) and stirred overnight. The suspension was cooled to 10° C. and the precipitate was collected by filtration, washed with cold water (560 ml) and then propan-2-ol (155 ml) and dried to give the intermediate (45.7 g)

Preparation of Intermediate D

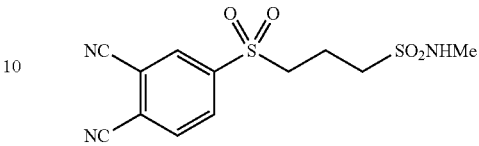

Intermediate C (66.8 g) was added to an 40% aqueous solution of methylamine (67.95 g) in acetonitrile (96 ml) at <5° C. over 20 minutes and reaction was stirred for 2.5 hours. The precipitated solid was filtered off, washed with acetonitrile (3×30 ml) and dried to give the product (28 g).

Preparation of Intermediate E

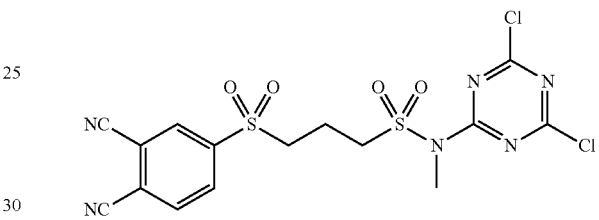

A solution of intermediate D (32.7 g) in acetone (500 ml) was added to cyanuric chloride (18.5 g) in acetone (150 ml) at 0° C. and stirred at this temperature for 2 hours, maintaining the pH at 6 with 0.5M sodium hydroxide solution. The precipitated solid was filtered off, washed with ice cold water (2×250 ml) and dried to give the damp product (65.2 g).

Preparation of the Title Phthalonitrile

A solution of aniline 2,5 disulphonic acid (27.5 g) in water (250 ml) was added to intermediate E (63.2 g) in acetonitrile (800 ml) and heated at 40° C. and at pH 5 to 7 overnight. The reaction solvent was removed under reduced pressure, water (50 ml) was added and then brine (60 ml) the solid which precipitated of filtered off, washed with 10% brine and dried to give product (91.1% strength, 22 g).

Phthalonitrile K

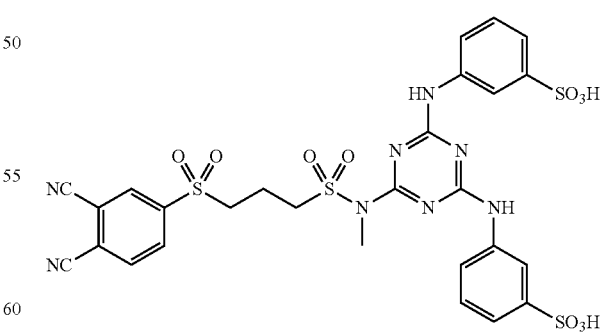

A solution of metanillic acid (1.5 g) in water (20 ml), adjusted to pH 5 to 6 was added to intermediate E (4.04 g) in acetonitrile (80 ml) and stirred at pH 6 to 8 for 1.5 hours at 35 to 40° C. Further metanillic acid (1.5 g) in water (20 ml) was added and the reaction was warmed to 70-75° C. and stirred at pH 7 to 8.5 for 12 hours. The reaction was evaporated to remove acetonitrile and the residue was diluted with water (40 ml). The precipitated solid was filtered off and stirred in methanol (100 ml), collected by filtration, washed with methanol (2×50 ml) and dried (2.8 g). A further crop was recovered from the methanol filtrate by reducing to low volume, and collecting and drying the solid which precipitated (2.8 g).

Phthalonitrile L

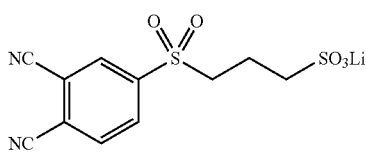

Dimethylsulphoxide (290 ml) was added to 4-nitrophthalonitrile (60.15 g) followed by 3-mercaptopropanesulphonic acid, sodium salt (72.2 g). Lithium carbonate (28.24 g) was the added portion-wise and the reaction was heated at 35° C. for 1 hour. The reaction was then heated to 58° C. and filtered and the filtrate was added to a solution of lithium chloride (295 g) in water (335 ml). This was left over the weekend and the precipitated solid was collected by filtration, washed with propan-2-ol (370 ml) and dried to give the sulfide (88.9 g) shown below

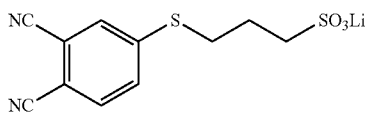

The sulfide (88 g) was added to water (155 ml) heated to 50° C. and then cooled to 30° C. Water (17 ml), glacial acetic acid (10 m) and sodium tungstate dihydrate (1.5 g) were added and the mixture was heated to 46° C. 35% Hydrogen peroxide (57 ml) was then added drop-wise at 55-60° C. and reaction heated to 58° C. for 1 hour. The mixture was then cooled to 45° C. and excess hydrogen peroxide destroyed with sodium sulphite. The reaction was filtered, lithium chloride (50 g) was added and the mixture was cooled to 9° C. The solid which precipitated was collected by filtration washed with propan-2-ol (150 ml) and dried to give the product (53.1 g).

Phthalonitrile M

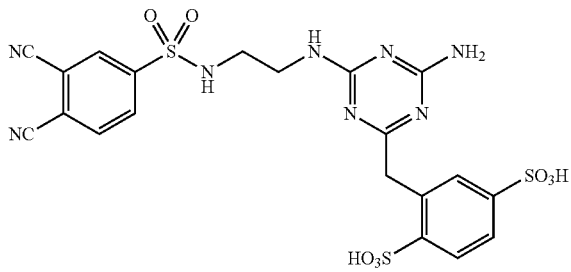 [SMILES: N#Cc1ccc(S(=O)(=O)NCCNc2nc(N)nc(Cc3cc(S(=O)(=O)O)ccc3S(=O)(=O)O)n2)cc1C#N]

Phthalonitrile M was prepared as phthalonitrile E except that ammonia was used instead of dimethylamine in the preparation of intermediate B.

Phthalonitrile N

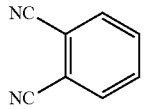

Obtained from Aldrich®.

Example 1

Process Example

Preparation of a Mixture of Dyes Comprising as a Component Dyes of the Following Formula

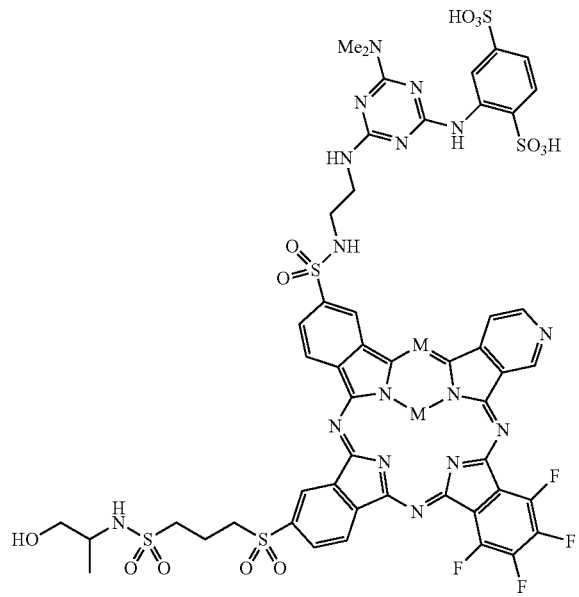

Phthalonitrile B (1.86 g), Phthalonitrile E (3.35 g) Phthalonitrile G (1.05 g) and Azaphthalonitrile I (0.65 g) were dissolved in diethylene glycol (18 g) and acetic acid (0.2 g) by heating to 120° C. The mixture was cooled to 80° C. and triethylorthoacetate (2.92 g) copper(II) chloride (0.67 g) and lithium acetate (0.65 g) were added. The reaction mixture was then heated to 120° C. for 4 hours. The reaction mixture was cooled to 80° C. and ethylenediaminetetraacetic acid (0.35 g) and concentrated hydrochloric acid (1 ml) were added and the mixture was heated at 85° C. for 1 hour. Propan-2-ol (60 ml) was then added and the precipitate which formed was collected by filtration and washed with propan-2-ol (60 ml). The solid was then stirred at reflux in a mixture of propan-2-ol (70 ml) and water (10 ml) for 0.5 hour, filtered, washed with propan-2-ol (60 ml) and dried. The solid was dissolved in water (300 ml), raised to pH9 with 2M lithium hydroxide, dialysed, filtered and dried to give a solid. (3.3 g).

Example 2

Process Example

Prepared as Example 1 except that Phthalonitrile B (1.86 g), Phthalonitrile E (3.35 g) Phthalonitrile G (1.05 g) and Azaphthalonitrile H (0.66 g) were used to give a solid product (2.46 g).

Example 3

Process Example

Prepared as Example 1 except that Phthalonitrile B (1.86 g), Phthalonitrile E (3.34 g) Phthalonitrile F (1.36 g) and Azaphthalonitrile H (0.65 g) were used to give a solid (5.87 g).

Example 4

Process Example

Prepared as Example 1 except that Phthalonitrile B (5.4 g), Phthalonitrile E (5.0 g), Phthalonitrile F (0.99 g) and Azaphthalonitrile H (0.48 g) were used to give a solid (8.1 g).

Example 5

Process Example

Prepared as Example 1 except that Phthalonitrile B (1.87 g), Phthalonitrile E (3.34 g), Phthalonitrile F (1.36 g) and Azaphthalonitrile I (0.66 g) were used to give a solid (5.43 g).

Examples 6 to 17

The dyes of Examples 6 to 22 were prepared as described in Example 1 except that the Phthalonitrile and Azazaphthalonitrile components were varied as shown below.

| Example | Ph | Mol eq | Ph | Mol eq | Ph | Mol eq | Ph | Mol eq |
|---|---|---|---|---|---|---|---|---|
| 6 | F | 0.5 | A | 2 | E | 1 | H | 0.5 |
| 7 | F | 1 | A | 1 | J | 1 | H | 1 |
| 8 | F | 1 | A | 1 | K | 1 | H | 1 |
| 9 | F | 0.5 | C | 2 | E | 1 | H | 0.5 |
| 10 | F | 0.5 | C | 1.75 | E | 1.25 | H | 0.5 |
| 11 | F | 0.5 | D | 1.8 | E | 1.2 | H | 0.5 |
| 12 | F | 0.5 | D | 2 | E | 1 | H | 0.5 |
| 13 | F | 0.5 | A | 2 | E | 1 | I | 0.5 |
| 14 | F | 0.5 | L | 2 | E | 1 | H | 0.5 |
| 15 | F | 0.75 | D | 1.5 | E | 1 | H | 0.5 |
| 16 | F | 0.5 | C | 1.85 | E | 1.15 | H | 0.5 |
| 17 | F | 0.5 | C | 1.75 | M | 1.25 | H | 0.5 |

Comparative Examples

The comparative example C1 was prepared as described in Example 1 except that the Phthalonitrile and Azaphthalonitrile components were varied as shown below.

| Example | Ph | Mol eq | Ph | Mol eq | Ph | Mol eq |
|---|---|---|---|---|---|---|
| C1 | A | 2 | E | 1 | N | 1 |

Example 18

Preparation of Inks

Ink were prepared by dissolving 3.5 g of the dyes of Examples 3, 6 and 9 and Comparative Example C1 in 96.5 g of a liquid medium comprising:

| | |
|---|---|
| Diethylene glycol | 7% |
| Ethylene glycol | 7% |
| 2-Pyrollidone | 7% |
| Surfynol$^{RTM}$ 465 | 1% |
| Tris buffer | 0.2% |
| Water | 77.8% (all % by weight) | and adjusting the pH of the ink to 8-8.5 using sodium hydroxide.

Surfynol® 465 is a surfactant from Air Products.

Example 19

Ink-Jet Printing

Inks prepared as described above were filtered through a 0.45 micron nylon filter and then incorporated into empty print cartridges using a syringe.

These inks were then ink-jet printed on to the following ink-jet media:

Epson® Ultra Premium Glossy Photo Paper (SEC PM);
Canon® Photo Paper Pro Platinum PT101 Photo Paper (PT101); and
HP Advanced Photo Paper (HPP).

The prints were tested for ozone fastness by exposure to 1 ppm ozone at 40° C., 50% relative humidity for 24 hours in a Hampden 903 Ozone cabinet. Fastness of the printed ink to ozone can be judged by the difference in the optical density before and after exposure to ozone.

Optical density measurements were performed using a Gretag® spectrolino spectrophotometer set to the following parameters:

Measuring Geometry: 0°/45°
Spectral Range: 380-730 nm
Spectral Interval: 10 nm
Illuminant: D65
Observer: 2° (CIE 1931)
Density: Ansi A
External Filler: None Ozone fastness is assessed by the percentage change in the optical density of the print, where a lower figure indicates higher fastness The results are shown in the following table:

Ozone Fastness

| Dye in the Ink | Substrate | ROD Loss |
|---|---|---|
| C1 | HPP | 15 |
| | PT101 | 20 |
| | SEC PM | 16 |
| Example 3 | HPP | 7 |
| | PT101 | 11 |
| | SEC PM | 6 |
| Example 6 | HPP | 8 |
| | PT101 | 13 |
| | SEC PM | 7 |
| Example 9 | HPP | 10 |
| | PT101 | 15 |
| | SEC PM | 10 |

Clearly inks prepared using the dyes of the present invention display a clear advantage in ozone fastness.

Further Inks

The inks described in Tables A and B may be prepared using the compound of Example 1. The dye indicated in the first column is dissolved in 100 parts of the ink as specified in the second column on. Numbers quoted in the second column onwards refer to the number of parts of the relevant ink ingredient and all parts are by weight. The pH of the ink may be adjusted using a suitable acid or base. The inks may be applied to a substrate by ink-jet printing.

The following abbreviations are used in Tables A and B:
PG=propylene glycol
DEG=diethylene glycol
NMP=N-methyl pyrrolidone
DMK=dimethylketone
IPA=isopropanol
2P=2-pyrrolidone
MIBK=methylisobutyl ketone
P12=propane-1,2-diol
BDL=butane-2,3-diol
TBT=tertiary butanol

TABLE A

| Dye | Water | PG | DEG | NMP | DMK | IPA | 2P | MIBK |
|---|---|---|---|---|---|---|---|---|
| 2.0 | 80 | 5 | | 6 | 4 | | 5 | |
| 3.0 | 90 | | 5 | 5 | | | | |
| 10.0 | 85 | 3 | | 3 | 3 | | 6 | |
| 2.1 | 91 | | 8 | | | | | 1 |
| 3.1 | 86 | 5 | | | | 4 | | 5 |
| 1.1 | 81 | | | 9 | | | 10 | |
| 2.5 | 60 | 4 | 15 | 3 | 3 | 6 | 5 | 4 |
| 5 | 65 | | 20 | | | 10 | 5 | |
| 2.4 | 75 | 5 | 10 | | 5 | | | 5 |
| 4.1 | 80 | 3 | 5 | 2 | 10 | | | |
| 3.2 | 65 | | 5 | 4 | 6 | 5 | 10 | 5 |
| 5.1 | 96 | | | | | | 4 | |
| 10.8 | 90 | 5 | | | 5 | | | |
| 10.0 | 80 | 2 | 6 | 2 | 5 | 1 | 4 | |
| 1.8 | 80 | | 5 | | | | 15 | |
| 2.6 | 84 | | | 11 | | | 5 | |
| 3.3 | 80 | 4 | | | 10 | | | 6 |
| 12.0 | 90 | | | | 7 | 3 | | |
| 5.4 | 69 | 2 | 20 | 2 | 1 | | 3 | 3 |
| 6.0 | 91 | | | 4 | | | 5 | |

TABLE B

| Dye | Water | PG | DEG | NMP | TBT | BDL | PI2 |
|---|---|---|---|---|---|---|---|
| 3.0 | 80 | 20 | | | | | |
| 9.0 | 90 | | 5 | | | | 5 |
| 1.5 | 85 | 5 | 5 | | 5 | | |
| 2.5 | 90 | | 6 | 4 | | | |
| 3.1 | 82 | 4 | 8 | | | | 6 |
| 0.9 | 85 | | 10 | | | 5 | |
| 8.0 | 90 | | 5 | 5 | | | |
| 4.0 | 70 | | 10 | 4 | | 5 | 11 |
| 2.2 | 75 | 10 | 10 | 3 | | 2 | |
| 10.0 | 91 | | | 9 | | | |
| 9.0 | 76 | | 9 | 7 | 3 | | 5 |
| 5.0 | 78 | 5 | 11 | | | 6 | |
| 5.4 | 86 | | | 7 | 7 | | |
| 2.1 | 70 | 5 | 10 | 5 | 5 | 5 | |
| 2.0 | 90 | | 10 | | | | |
| 2 | 88 | | 12 | | | | |
| 5 | 78 | | | 5 | | 7 | 10 |
| 8 | 70 | 2 | 20 | 8 | | | |
| 10 | 80 | 10 | 10 | | | | |
| 10 | 80 | | 20 | | | | |

The invention claimed is:

1. A process for preparing azaphthalocyanine dyes and salts thereof or metallo-azaphthalocyanine dyes and salts thereof which comprises cyclising a compound of Formula (1) with a compound of Formula (2) and/or Formula (3) and a compound of Formula (4) and/or Formula (5):

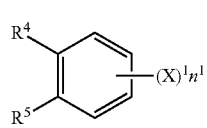

Formula (1)

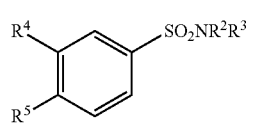

Formula (2)

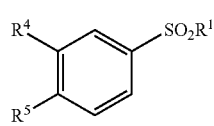

Formula (3)

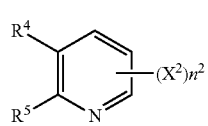

Formula (4)

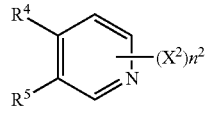

Formula (5)

wherein:
$R^1$ is optionally substituted alkyl, optionally substituted aryl or optionally substituted heterocyclyl;
$R^2$ is H, optionally substituted $C_{1-8}$alkyl optionally interrupted by one or more hetero atoms, optionally substituted heteroaryl or optionally substituted phenyl;
$R^3$ is H, optionally substituted alkyl, optionally substituted aryl or optionally substituted heterocyclyl;
$R^4$ and $R^5$ are cyano, carboxy, carboxamide or together form a group of formula

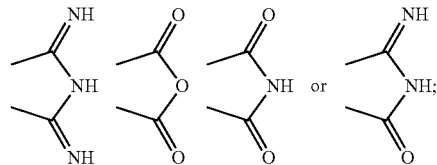

$X^1$ is Cl or F;
$X^2$ is selected from the group consisting of CN, optionally substituted $C_{1-4}$alkyl and $C_{1-4}$alkoxy;
$n^1$ is 4; and
$n^2$ is 0 to 3;
wherein the cyclisation process is optionally carried out in the presence of a suitable nitrogen source and a metal salt.

2. A process as claimed in claim 1 wherein the dyes are copper azaphthalocyanine dyes and salts thereof.

3. A process as claimed in claim 1 wherein $R^1$ is a group of Formula (6)

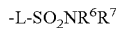 -L-SO$_2$NR$^6$R$^7$      Formula (6)

wherein:
$R^6$ is H or optionally substituted $C_{1-4}$alkyl;
$R^7$ is H or optionally substituted $C_{1-4}$alkyl; and
L is optionally substituted $C_{1-4}$alkylene.

4. A process as claimed in claim 1 wherein $R^2$ is optionally substituted $C_{1-4}$alkyl optionally interrupted by one or more hetero atoms carrying an optionally substituted triazinyl group.

5. A process as claimed in claim 4 wherein the optionally substituted triazinyl substituent on $R^2$, when it is optionally substituted $C_{1-4}$alkyl optionally interrupted by one or more hetero atoms, comprises a group of Formula (7)

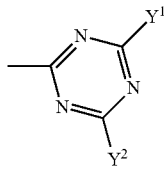

Formula (7)

wherein:
- $Y^1$ is selected from the group consisting of —$OR^8$, —$SR^9$, and —$NR^8R^9$;
- $Y^2$ is selected from the group consisting of —$OR^{10}$, —$SR^{11}$, —$NR^{10}R^{11}$;
- $R^8$, $R^9$, $R^{10}$ and $R^{11}$ are independently H, optionally substituted alkyl optionally interrupted by one or more hetero atoms, optionally substituted aryl or optionally substituted heterocyclyl provided that at least one of the groups represented by $R^8$, $R^{9-}$, $R^{10}$ and $R^{11}$ carries at least one substituent selected from the group consisting of —$SO_3H$, —$CO_2H$ and —$PO_3H_2$.

6. A process as claimed in claim 4 wherein the optionally substituted triazinyl substituent on $R^2$, when it is optionally substituted $C_{1-4}$alkyl (optionally interrupted by one or more hetero atoms), comprises a group of Formula (8)

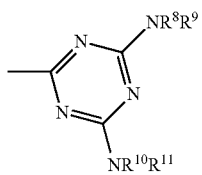

Formula (8)

wherein:
- $R^8$ is H or optionally substituted $C_{1-4}$alkyl;
- $R^9$ is H or optionally substituted $C_{1-4}$alkyl;
- $R^{10}$ is H or optionally substituted $C_{1-4}$alkyl;
- $R^{11}$ is optionally substituted alkyl, optionally substituted aryl or optionally substituted heterocyclyl carrying at least one substituent selected from the group consisting of —$SO_3H$, —$CO_2H$ and —$PO_3H_2$.

7. A process as claimed in claim 1 wherein $R^4$ and $R^5$ are cyano or carboxy.

8. A process as claimed in claim 1 wherein $X^1$ is Cl.

9. Azaphthalocyanine dyes and salts thereof or metallo-azaphthalocyanine dyes and salts thereof obtained by a process according to claim 1.

10. Metallo-azaphthalocyanine dyes and salts thereof as claimed in claim 9 which components of Formula (9) and/or Formula (10):

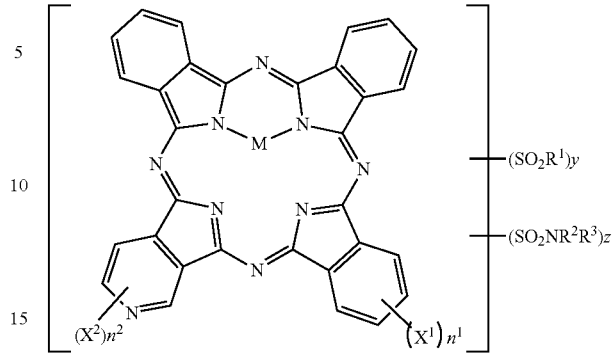

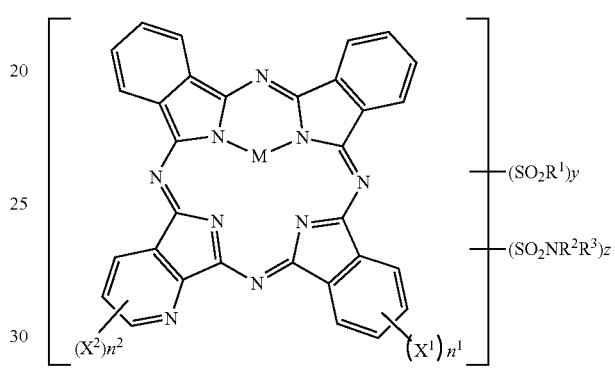

wherein
- M is Ni or Cu;
- $R^1$ is optionally substituted alkyl, optionally substituted aryl or optionally substituted heterocyclyl;
- $R^2$ is H, optionally substituted $C_{1-8}$alkyl optionally interrupted by one or more hetero atoms, optionally substituted heteroaryl or optionally substituted phenyl;
- $R^3$ is H, optionally substituted alkyl, optionally substituted aryl or optionally substituted heterocyclyl;
- $X^1$ is Cl or F;
- $X^2$ is selected from the group consisting of CN, optionally substituted $C_{1-4}$alkyl and $C_{1-4}$alkoxy;
- $n^1$ is 4;
- $n^2$ is 0 to 3;
- y is greater than 0 and less than 4;
- z is greater than 0 and less than 4; and
- y+z is greater than 0 and less than 4.

11. A composition comprising azaphthalocyanine dyes and salts thereof and/or metallo-azaphthalocyanine dyes and salts thereof, as claimed in claim 9 and a liquid medium.

12. A process for forming an image on a substrate comprising applying a composition, according to claim 11, thereto by means of an ink-jet printer.

13. A material printed with azaphthalocyanine dyes and salts thereof and/or metallo-azaphthalocyanine dyes and salts thereof, as claimed in claim 9.

14. An ink-jet printer cartridge comprising a chamber and a composition, wherein the composition is in the chamber and the composition is as defined in claim 13.

* * * * *